United States Patent [19]

Levinson

[11] 4,280,032
[45] Jul. 21, 1981

[54] EGG COOKING IN A MICROWAVE OVEN

[76] Inventor: Melvin L. Levinson, 1 Meinzer St., Avenel, N.J. 07001

[21] Appl. No.: 12,050

[22] Filed: Feb. 14, 1979

[51] Int. Cl.³ .............................................. H05B 6/80
[52] U.S. Cl. ............................... 219/10.55 E; 99/336; 99/417; 99/440; 219/10.55 F; 426/243
[58] Field of Search ................... 219/10.55 E, 10.55 F, 219/10.55 M, 10.55 R, 281, 342; 99/403, 336, 440, 410, 413, 416, 417; 426/113, 241, 243

[56] References Cited

U.S. PATENT DOCUMENTS

| | | | |
|---|---|---|---|
| 2,807,701 | 9/1957 | Conlin et al. | 99/440 |
| 3,985,990 | 10/1976 | Levinson | 219/10.55 E |
| 3,985,991 | 10/1976 | Levinson | 219/10.55 E |
| 4,027,132 | 5/1977 | Levinson | 219/10.55 E |
| 4,112,833 | 9/1978 | Oda et al. | 219/10.55 E X |
| 4,133,996 | 1/1979 | Fread | 219/10.55 E X |
| 4,140,889 | 2/1979 | Mason et al. | 219/10.55 E |
| 4,156,806 | 5/1979 | Teich et al. | 219/10.55 E |

*Primary Examiner*—Arthur T. Grimley

[57] ABSTRACT

A microwave-reflective first container, designed to preclude microwave exposure of the sides and bottom and limit exposure to the top of a shelled, raw egg contained therein, is covered by a microwave-permeable lid and nested within a microwave-permeable second container so that the bottom and lower sides of said first container are in physical contact with a microwave-lossy liquid contained therein. Also, disclosed are (1) temperature monitoring, (2) a spoon shape to said first container's bottom, (3) restricting the ability of said first container to rotate and (4) methods of using said apparatus to soft and hard cook raw, shelled eggs from both their prefrozen and room temperature states.

9 Claims, 4 Drawing Figures

EGG COOKING IN A MICROWAVE OVEN

BACKGROUND OF THE INVENTION

1. Field of the Invention

This invention concerns apparatus and methods to soft cook and hard cook eggs in a microwave oven.

2. Description of Prior Art

To achieve the versatility in microwave cooking that is expected in gas and electric cooking, a microwave oven must be supplied with as many different type and size cooking utensils as are available for gas and electric cooking. Special utensils must be employed, in many cases, to provide results in microwave cooking which are comparable to those expected from gas and electric cooking.

Numerous novel cooking containers have already been developed for microwave cooking. My U.S. Pat. Nos. 3,731,037, 3,777,099 and 3,881,027 disclose microwave-lossy heating elements in combination with microwave-reflective, heat-conductive containers. While it is possible to fry and bake eggs using my former teachings, the ability to properly soft and hard cook eggs with the speed and convenience expected from microwave ovens has presented a problem. One solution to cook said eggs is to completely enclose an egg (in its shell) in a perforated metal container or wrap it in aluminum foil and submerge it in water and boil said microwave-shielded egg in said water in a microwave oven. But, so wrapping an egg in aluminum foil and cooking is not convenient as a hot egg package must be unwrapped and, still hot, its shell broken. Moreover, proper timing presents a problem as the cooking egg white is hidden from view and the hot wet egg cools rapidly until its shell dries and continues to cool rapidly as it is unshelled and deposited in a cool dish. The ability to shield from microwave exposure one area of an article while selectively heating a second area of said article is old to the art and taught in U.S. Pat. No. 2,714,070.

This invention provides apparatus and methods to soft or hard cook eggs in a microwave oven with text book results. For example, as taught in The Other Half of the Egg by H. McCully, J. Pepin and W. Fayme, M. Barrows & Company, Inc., NY, 1967, on page 21, as follows: "*Boiled Eggs.* The term "boil" in relation to eggs, whether soft or hard, has long since been abandoned because it implies high fast heat, which, at least, can only lead to rubbery white and discolored yolks, at the worst to cracked and leaking shells, water logged and lopsided eggs. *Soft-Cooked Eggs.* Perfectly cooked, the white is tender but solidified, and the yolk is liquid to semi liquid." And, for example as taught in "Egg Cooking", L. Pappas, 101 Productions, San Francisco, Calif. 94703, 1976, on page 15, as follows: "The different egg portions coagulate at different temperatures, resulting in thickening. Egg whites become jelly-like at 140° and firm at about 149° and complete the process at 150°. . . . When the egg coagulates, it first forms a clot, like a lacy network. If overheating occurs, the network contracts, forcing out the liquid. This explains why it is so important not to overcook egg dishes."

The problem of soft cooking an egg by directly exposing said egg to microwave energy is complicated by the fact that, if the egg is, it is subject to exploding and, if unshelled, the yolk hard cooks and ruptures before the white can heat and solidify.

SUMMARY OF THE INVENTION

A shelled, raw egg is placed into a special narrow-mouthed, tapered metal utensil which is constructed and proportioned to accept just the yolk at its bottom when the yoke, which is densor than the egg white, sinks therein. On said bottom said yolk lies covered by the egg white. Said metal utensil is covered and placed in a microwave lossy liquid within a special microwave-permeable utensil and then exposed to microwave energy. The cooking process can be temperature monitored and the egg frozen or unfrozen prior to exposure to microwave energy.

DESCRIPTION OF THE PREFERRED EMBODIMENT

Figure 1:
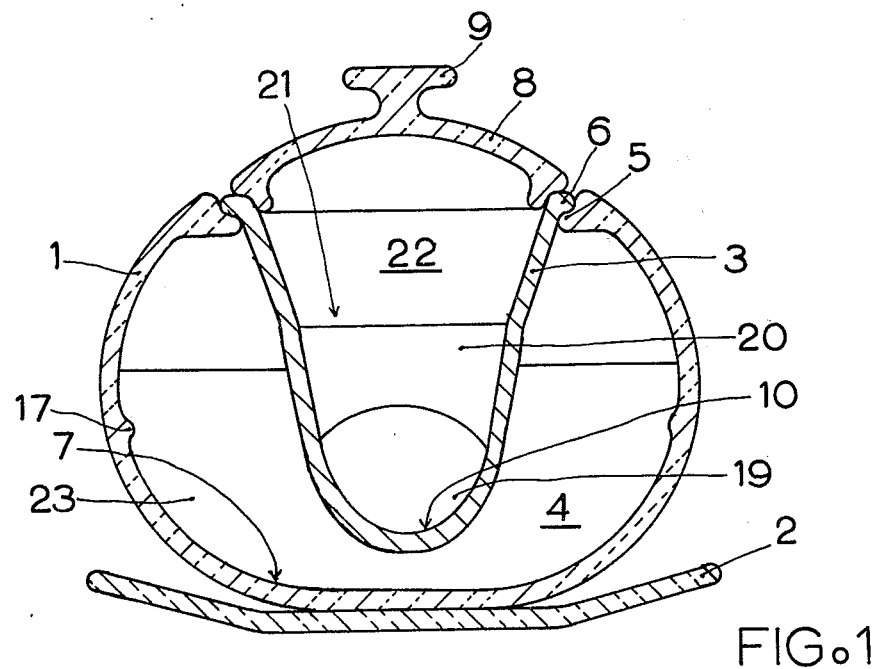
FIG. 1 is a cross section of one embodiment of the invention containing an egg.

In FIG. 1 an outer container 1, resting in saucer 2, is shown with inner container 3 partially submerged in outer chamber 1's liquid chamber 4. Outer chamber rim 5 mates with inner container rim 6 to support inner container 3 within microwave lossy material 23 within liquid chamber 4 spaced from the floor 7 of container 1. Cover 8 with its cover knob 9 (to permit easy removal of cover 8) covers the opening of inner container 3.

Figure 2:
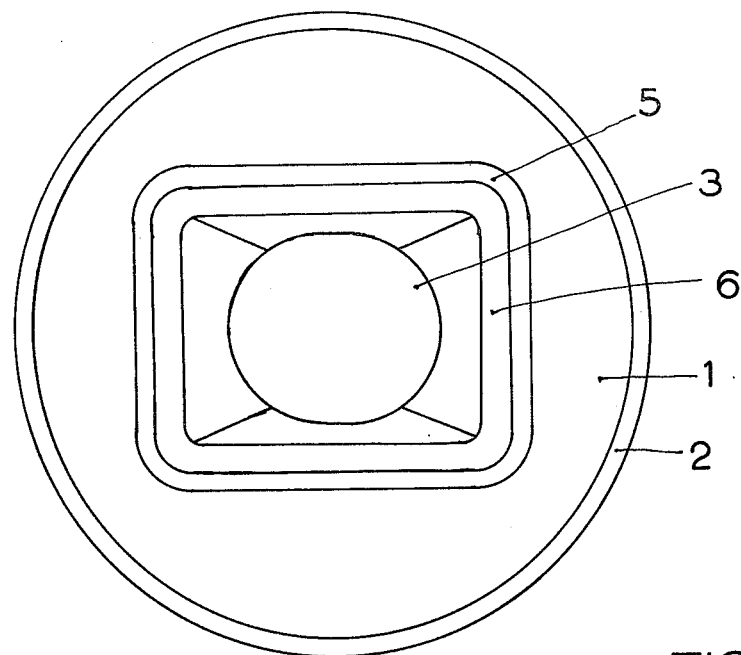
FIG. 2 is the top view of the embodiment of FIG. 1 without said egg or the cover.

FIG. 2 is a top view of FIG. 1, without cover 8, to illustrate that the rims of outer container 1 and inner container 3 are not circular so that inner container 3 cannot rotate freely within outer container 1. Notwithstanding the non-circular shape of said rims, the inner side and bottom walls 10 of inner container 3 are preferably shaped to mate with the edge of a spoon (not shown) to permit the easy, sure removal of all of (cooked) egg 21 and to provide a smooth rounded surface for subsequent simplified clean up of inner container 3 if it is desired to reuse container 3. To additionally aid in subsequent clean up, a cooking spray, as PAM which is distributed by BoyleMidway Inc., New York, N.Y. 10017, can be sprayed on the inside of inner container 3 prior the introduction of a shelled egg therein.

Figure 4:
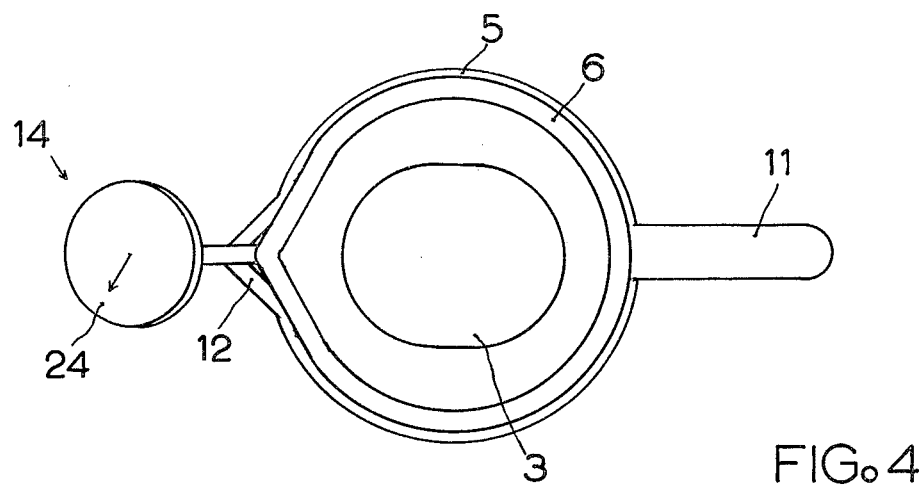
FIG. 4 is the top view of the embodiment of FIG. 3 without said egg or the cover.
Figure 3:
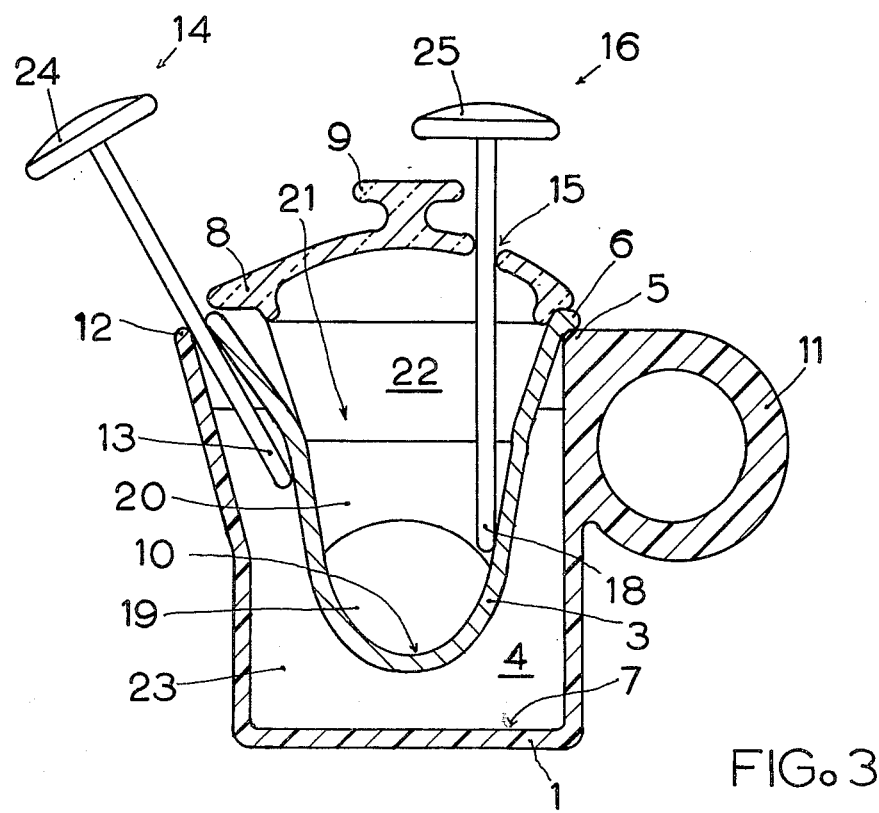
FIG. 3 is a cross section of another embodiment of the invention containing an egg.

FIG. 3 is another embodiment of the invention essentially similar to FIG. 1 but differing in that container 1 is shown with handle 11 and spout 12. FIG. 4 is a top view of FIG. 3, without cover 8, to illustrate that the rims of outer container 1 and inner container 3 are not circular so that inner container 3 cannot rotate freely within outer container 1. Spout 12 has utility as a pouring spout and as an access opening to liquid chamber 4 which opening will permit the insertion of sensing element 13 of thermometer 14 into liquid 23. Thermometer 14 can be positioned so that its read-out member 24 can be read through a door window (not shown) on a microwave oven (not shown). Thermometer 14 can be a metal thermometer (as Weston Model No. 2261) or a microwave-oven thermometer probe which is sold as a part of certain well known microwave ovens.

As an option cover 8 can be supplied with an access opening 15 to support a second thermometer 16 with a read out 25. Thermometer 16's sensing element 18 passes through cover opening 15, through the white 20 of raw shelled egg 21 located in inner container's egg chamber 22, and is directed so that sensing element 18 rests in juxtaposition with yoke 19. Thermometer 14 and thermometer 16 have utility used independently or together.

Outer container 1 and cover 8 are best made of a microwave-permeable, microwave-non-lossy, light-transparent material capable of withstanding the boiling temperature of water, for example, borosilicate glass and polysulphone plastic. If cover 8 is glass, cover knob 9 is best jacketed with a microwave-non-lossy, heat-insulating material as Silicone Rubber (not shown) so that hot cover 8 may be handled without pot holders. The material of handle 11 and saucer 1 is selected to complement the material selected for outer container 1. Inner container 3 is best constructed of drawn aluminum. My egg cooking apparatus can be either (1) a one time disposable apparatus (e.g. light plastic container with cover combined with an aluminum foil inner container), (2) a reusable apparatus (e.g. borosilicate glass outer container and cover with a heavy gauge aluminum inner container) or (3) a decorative exotic reusable apparatus (e.g. a colorful, bone-chain outer container and cover with a gold anodized aluminum inner container).

Inner container 3's sides and bottom 10, in contact with egg 21, are best made to conform to the shape the spoon which will be used to partake of the cooked egg. Inner container 3's and outer container 1's tops are best made non symetrical so that while they are best made to mate they are not free to rotate independently of one another. This means that the weight of the outer container will add to that of the inner container to prevent said inner container from rotating when a spoon is used to scoop cooked egg out of said inner container which is being buoyed up by water in said outer container.

I have discovered that a container which can contain four ounces is a useful size for a two ounce egg. Too small and wide a container 3 and yolk 19 of an average large egg 21 will too closely approach the top of container 3 and there receive too much microwave radiation which will result in the yoke cooking hard before the egg white coagulates. Too large, narrow and deep a container 3 and the yoke 19, falling to the bottom of container 3, can be too well shielded from microwave radiation. In operation the white of an egg is relatively non-lossy compared to both the yolk and the water added as a heating element. If the yolk is completely shielded from microwave radiation, a three minute boiled egg will take three minutes to cook. It follows that a microwave oven will offer no advantage in speed over a conventional gas or electric range. Cooking soft and hard cooked eggs in a microwave oven by my improved system is convenient and offers a saving in energy cost as my system requires substantially less water to heat than is required in gas or electric egg cooking. Less water also means said water heating to egg cooking temperatures faster. My system has added advantage for microwave energy may be terminated short of full egg cooking and the egg cooking completed external the microwave oven from the heat stored in said water. The final cooking of the egg white can be observed through transparent cover 8 by the person desiring to partake of the cooked egg so that said person can always obtain the desired cooked product. With practice the amount of water, the exposure time and resting time can be determined so that an egg can be soft or hard cooked to a particular taste by the exact time the water heating element cools to a point where further coagulation of the egg white will no longer occur. At this point the heat energy stored in the still hot water can be employed to maintain the cooked egg hotter longer than it would be possible to keep said egg hot without the added heat stored in said hot water. My method differs from conventional gas or electric egg cooking where is taught to remove a cooked egg from its cooking water to be shelled and the heat energy remaining in said cooking water is abandoned. It is expected that some will wish to cook a number of eggs packaged individually in inner container 3's sequentially in one outer container 1 to take advantage of the hot water from a previous egg cooking.

In operation, in a series of trials, water is added to outer container 1 whereupon container 3 (with shelled egg 21 therein) is inserted into container 1 until the water level outside of container 3 corresponds approximately to the top level of egg inside of container 3. Container 3 is removed, the water level falls. Then a mark 17 is fixed on the wall of container 1 to indicate, for future use, the proper water level in container 1 prior the introduction of container 3 with contents. In initial heating trials and as a later option, during a microwave exposure, the water level in container 1 can be temperature monitored by thermometer 14. Once the proper time is established for a particular grade of egg, in a particular microwave oven, thermometer 14 is no longer essential. Thermometer 14 is helpful for those who consider a particular temperature, as 170° F., 180° F. et al, to be the proper cooking temperature. For the purest, who considers one temperature far superior to another, a microwave oven with a fully variable power control should be considered. For those who consider it best to cook their eggs in boiling water, thermometer 14 is not required. Thermometer 14 is useful to determine the point, circa 150° F., where the heated water ceases to cook the egg and the water reverts to a heat resevoir to hold said cooked egg hot. Some microwave ovens include, as an accessory, a plug-in-electric-thermometer and semi conductor circuitry so that an operator of said oven can program the results desired into the memory circuit of said oven for automatic programed operation.

A transparent cover 8 is best employed to cover inner container 3 so that, in operation, positive-pressure hot-vapor will blanket the top of the cooking egg. I prefer that any steam released from container 1 not be blocked by cover 8 and that, unless it is particularly desired, that steam escaping container 1 not be permitted to impinge on egg 21 where it could condense to water an result in a poached egg effect.

I have discovered that it is possible to cook eggs from frozen. Freezing kills the growing embryo in the egg and makes possible long term storage of eggs. Thermometer 16 is useful when its sensing element 18 is inserted through cover 8 and placed in juxtaposition with yoke 19 (when defrosted). From frozen, soft cooking an egg takes more care than hard cooking. The results obtained soft cooking a frozen egg are not the same as those that result from cooking a defrosted egg. Some will find the results of soft cooking defrosted eggs desireable while others will find the results of soft cooking prefrozen eggs desireable. The difference is that soft cooked from frozen the yolk may not be as liquid as if soft cooked never frozen. Egg white seems a good heat-insulating material. Hence boiling temperatures or extended lower heat times is indicated to defrost and cook an egg and at the same time properly heat the yolk. From frozen, care must be exercised and practice is needed for the temperature difference between a hot yolk and a hard cooked yolk is small for example, during defrosting and heating of a frozen egg, the egg may be turned.

A shelled egg can be frozen in an inner container 3 resting in an outer container 1. To defrost and cook, cooking water is added to container 1 and the assembly exposed to microwave radiation. Alternately, fresh eggs can be directly frozen. Freezing an egg cracks its shell as the egg, on freezing, expands. I prefer to surface defrost and wet most foods before exposing them to microwave energy in a microwave oven. This surface defrosting and wetting of frozen foods is more fully described in my copending U.S. Patent application, Microwave Oven Cooking Method, Ser. No. 4324, filed Jan. 17, 1979. Surface defrosting (e.g. immersing frozen egg in warm water) a frozen cracked egg defrosts the egg directly beneath its shell. This provides a most convenient way to shell and egg. The unshelled, raw frozen egg is then placed in inner container 3 and exposed as here taught to microwave energy. As the frozen egg defrosts, it changes shape (melts) which action aides in the more uniform heating of the egg. It is expected that one day eggs will be frozen in trays and stored in freezers for ultimate use just as are ice cubes in ice cube trays.

Although this invention has been described with a certain degree of particularity, it should be understood that the present disclosure has beem made only by way of example and that numerous changes in the details of construction and in the combination and arrangement of parts and in the methods described may be resorted to without departing from the spirit and scope of the invention.

I claim:

1. A utensil to cook an egg in a microwave oven which comprises:
   a microwave-reflective, heat-conductive, open-mouthed first container with inner side walls and a floor which define a chamber and where said inner walls and floor are constructed so that, when said egg is contained in said chamber, the yoke of said egg, which is denser than the white of said egg, will sink through said egg white by gravity until said yolk is microwave shielded from beneath by contacting said first container's floor and lower side walls and said yolk rests on said floor beneath said egg white,
   a microwave-permeable second container disposed in a spaced relationship with said first container to that, at least, a portion of the heat-conductive outer surface of said first container will be in physical contact with a microwave-lossy liquid when said liquid is outside said first container and inside said second container.

2. A utensil to cook an egg, according to claim 1, which includes:
   a microwave-permeable, light-transparent cover for said first container.

3. A utensil to cook and egg, according to claim 1, which includes:
   means to measure the temperature of said microwave-lossy liquid.

4. A utensil to cook an egg, according to claim 1, which includes:
   means to measure the temperature of the yolk of said egg when said egg is in said first container.

5. A utensil to cook an egg, according to claim 1, which includes:
   means to prevent said first container, when contained in said second container, from rotating independent from said second container.

6. A utensil to cook an egg, according to claim 1, which includes:
   where the egg-contacting-surface of said first container is smooth and round so that said smooth-round surface facilitates the removal of said egg when a spoon with a rounded bowl is used to remove said egg from said utensil.

7. A utensil designed to cook an egg, according to claim 1, which includes:
   indicia on the wall surface of said second container to effect measurement of said microwave-lossy liquid when said liquid is inside said second container.

8. A utensil to cook an egg in a microwave oven which comprises:
   a narrow-mouthed, tapered, heat-conductive, microwave-reflective first container whose side walls and floor define an open-mouthed chamber and whose lower side walls and floor are constructed to contain, when said egg is contained within said first container, just the yolk of said egg when said yolk, which is denser than the white of said egg, sinks by gravity beneath said white and rests on said floor beneath said egg white, and
   a microwave-permeable second container disposed in a spaced relationship with said first container so that, at least, a portion of the heat-conductive outer surface of said first container will be in physical contact with a microwave-lossy liquid when said liquid is outside said first container and inside said second container.

9. A utensil to cook an egg in a microwave oven, according to claim 8 which includes:
   where said open-mouthed container, when filled, will hold four ounces of water.

* * * * *